US012658643B2

(12) United States Patent
Lin et al.

(10) Patent No.: US 12,658,643 B2
(45) Date of Patent: Jun. 16, 2026

(54) FIRST CONNECTOR AND CONNECTOR ASSEMBLY WITH UNLOCKING SLIDER

(71) Applicant: DONGGUAN LUXSHARE TECHNOLOGIES CO., LTD, Dongguan City (CN)

(72) Inventors: Yanbo Lin, Dongguan City (CN); Rongzhe Guo, Dongguan City (CN)

(73) Assignee: DONGGUAN LUXSHARE TECHNOLOGIES CO., LTD, Dongguan City (CN)

( * ) Notice: Subject to any disclaimer, the term of this patent is extended or adjusted under 35 U.S.C. 154(b) by 291 days.

(21) Appl. No.: 18/228,259

(22) Filed: Jul. 31, 2023

(65) Prior Publication Data

US 2024/0136767 A1 Apr. 25, 2024
US 2024/0235117 A9 Jul. 11, 2024

(30) Foreign Application Priority Data

Oct. 25, 2022 (CN) ........................ 202211307601.8

(51) Int. Cl.
*H01R 13/639* (2006.01)
*H01R 12/72* (2011.01)
*H01R 13/436* (2006.01)
*H01R 13/516* (2006.01)

(52) U.S. Cl.
CPC ........... *H01R 13/639* (2013.01); *H01R 12/72* (2013.01); *H01R 13/4362* (2013.01); *H01R 13/516* (2013.01)

(58) Field of Classification Search
CPC ......................... H01R 13/639; H01R 13/4362; H01R 13/516; H01R 12/72
See application file for complete search history.

(56) References Cited

U.S. PATENT DOCUMENTS 5,791,930 A * 8/1998 Tabata ................. H01R 13/641 439/352
6,095,843 A * 8/2000 Kaneko ............. H01R 13/6275 439/352
6,679,720 B2 1/2004 Nakamura et al.
6,785,460 B2 * 8/2004 de Jong ............... G02B 6/3807 385/134

(Continued)

FOREIGN PATENT DOCUMENTS

CN 101359794 A 2/2009
CN 201311988 Y 9/2009

(Continued)

*Primary Examiner* — Thanh Tam T Le
(74) *Attorney, Agent, or Firm* — Birch, Stewart, Kolasch & Birch, LLP

(57) ABSTRACT

A first connector is configured to mate with a second connector along a mating direction. The first connector and the second connector are provided with locking structures for locking each other after mating. The first connector includes a first insulating body, a number of first conductive elements and an unlocking slider. The unlocking slider is slidable between an initial position and an unlocking position. When the unlocking slider reaches the unlocking position, the unlocking slider abuts against the locking structures to release a locking between the first connector and the second connector. A connector assembly having the first connector is also disclosed.

20 Claims, 14 Drawing Sheets

(56) References Cited

U.S. PATENT DOCUMENTS

| | | | | |
|---|---|---|---|---|
| 6,887,106 | B2 * | 5/2005 | Noguchi | H01R 13/6582 439/607.41 |
| 7,118,426 | B2 * | 10/2006 | Nakamura | H01R 13/4362 439/752 |
| 7,257,888 | B2 * | 8/2007 | Nelson | H01R 43/26 29/739 |
| 7,527,514 | B2 * | 5/2009 | Tsuji | H01R 13/6272 439/352 |
| 7,651,361 | B2 * | 1/2010 | Henry | H01R 13/6335 439/352 |
| 7,814,634 | B2 * | 10/2010 | Francis | H01R 43/26 29/762 |
| 8,434,218 | B2 * | 5/2013 | Nelson | H01R 43/26 29/748 |
| 8,641,293 | B2 * | 2/2014 | Lin | G02B 6/3898 385/76 |
| 9,103,996 | B2 * | 8/2015 | Lin | G02B 6/3898 |
| 9,614,327 | B2 * | 4/2017 | Marsh | H01R 13/641 |
| 9,666,989 | B2 * | 5/2017 | Horiuchi | H01R 13/64 |
| 9,761,998 | B2 * | 9/2017 | De Dios Martin | H01R 13/6335 |
| 9,972,936 | B2 * | 5/2018 | Matsumoto | H01R 13/641 |
| 10,185,099 | B2 * | 1/2019 | Chang | G02B 6/3825 |
| 10,230,207 | B2 * | 3/2019 | Krupp | H05K 13/0491 |
| 10,270,209 | B2 * | 4/2019 | Resendez | G06F 1/183 |
| 10,317,630 | B2 * | 6/2019 | Watanabe | G02B 6/3898 |
| 10,444,444 | B2 * | 10/2019 | Ma | G02B 6/3885 |
| 10,700,460 | B2 * | 6/2020 | Li | H01R 12/716 |
| 10,971,858 | B2 * | 4/2021 | Zhan | H01R 13/639 |
| 11,320,606 | B2 * | 5/2022 | Wong | G02B 6/3879 |
| 11,404,827 | B2 * | 8/2022 | Son | H01R 13/641 |
| 11,611,167 | B2 * | 3/2023 | He | H01R 13/506 |
| 2005/0170703 | A1 | 8/2005 | Nakamura | |
| 2008/0009171 | A1 | 1/2008 | Tsuji | |
| 2021/0249819 | A1 | 8/2021 | Son et al. | |

FOREIGN PATENT DOCUMENTS

| | | | |
|---|---|---|---|
| CN | 102195202 | A | 9/2011 |
| CN | 205790489 | U | 12/2016 |
| CN | 205863535 | U | 1/2017 |
| CN | 208336676 | U | 1/2019 |
| CN | 113078510 | A | 7/2021 |
| CN | 111834777 | B | 10/2021 |
| CN | 214379099 | U | 10/2021 |
| CN | 215343185 | U | 12/2021 |
| CN | 114927899 | A | 8/2022 |
| TW | 201304290 | A1 | 1/2013 |
| TW | M606139 | U | 1/2021 |

* cited by examiner

FIRST CONNECTOR AND CONNECTOR ASSEMBLY WITH UNLOCKING SLIDER

CROSS-REFERENCE TO RELATED APPLICATION

This patent application claims priority of a Chinese Patent Application No. 202211307601.8, filed on Oct. 25, 2022 and titled "FIRST CONNECTOR AND CONNECTOR ASSEMBLY", the entire content of which is incorporated herein by reference.

TECHNICAL FIELD

The present disclosure relates to a first connector and a connector assembly, which belong to the technical field of connectors.

BACKGROUND

Existing connector assemblies generally include a first connector and a second connector that cooperate with each other. The first connector generally includes a first insulating body and a plurality of first conductive elements. The second connector generally includes a second insulating body, a plurality of second conductive elements, and a receiving slot for at least partially receiving the first connector. When the first connector is inserted into the receiving slot of the second connector, the first conductive elements and the second conductive elements are electrically connected.

According to different use environments and structural designs of the connector assembly, when the first conductive elements and the second conductive elements are electrically connected, it is necessary to maintain the reliability of the mutual positional relationship between the first connector and the second connector. For this purpose, the first connector and the second connector are provided with locking structures that are lockable with each other.

However, when the first connector is mated with the second connector and needs to be separated, the locking structures need to be unlocked. In related technologies, it is usually unlocked by directly pulling an elastic arm with a finger. However, this unlocking method is not easy to operate. Besides, since different users apply different forces when pulling the elastic arm, excessive pulling force may easily cause the elastic arm to fail.

SUMMARY

An object of the present disclosure is to provide a first connector and a connector assembly that are easy to unlock and have high reliability.

In order to achieve the above object, the present disclosure adopts the following technical solution: a first connector, configured to mate with a second connector along a mating direction, the first connector and the second connector being provided with locking structures that lock with each other after mating, the first connector including: a first insulating body; a plurality of first conductive elements; and an unlocking slider slidable between an initial position and an unlocking position; when the unlocking slider reaches the unlocking position, the unlocking slider abuts against at least one of the locking structures, so as to release a locking between the first connector and the second connector.

In order to achieve the above object, the present disclosure adopts the following technical solution: a connector assembly, including: a first connector and a second connector, the first connector being configured to mate with the second connector along a mating direction, the first connector and the second connector being provided with locking structures that lock with each other after mating; the first connector including: a first insulating body; a plurality of first conductive elements; and an unlocking slider slidable between an initial position and an unlocking position; when the unlocking slider reaches the unlocking position, the unlocking slider abuts against at least one of the locking structures, so as to release a locking between the first connector and the second connector; the second connector including: a second insulating body, the second insulating body including a second mating surface and a second mating slot extending through the second mating surface; a plurality of second conductive terminals, each second conductive terminal including a second mating portion extending into the second mating slot; and a metal shell enclosing the second insulating body, the metal shell including a receiving chamber communicating with the second mating slot; after the first connector is mated with the second connector, the first insulating body is at least partially received in the receiving chamber, the second mating portions are in contact with the first conductive elements, and the first connector and the second connector are locked together through the locking structures; when the first connector and the second connector need to be unlocked, the unlocking slider reaches the unlocking position, the unlocking slider abuts against the locking structures to unlock the first connector and the second connector.

In order to achieve the above object, the present disclosure adopts the following technical solution: a connector assembly, including: a first connector and a second connector, the first connector being configured to mate with the second connector along a mating direction, the first connector and the second connector being provided with locking structures that lock with each other after mating; the first connector including: a first insulating body; a plurality of first conductive elements; and an unlocking slider slidable between an initial position and an unlocking position; when the unlocking slider reaches the unlocking position, the unlocking slider abuts against at least one of the locking structures, so as to release a locking between the first connector and the second connector; the second connector including: a second insulating body; a plurality of second conductive terminals; and a metal shell covering the second insulating body, the metal shell including a locking elastic arm, a first wall portion, a second wall portion opposite to the first wall portion, a connecting portion connecting the first wall portion and the second wall portion, a buckling portion connecting the first wall portion and the second wall portion, and a receiving chamber located between the first wall portion and the second wall portion; wherein a height of the first wall portion is greater than a height of the buckling portion; a height of the second wall portion is greater than the height of the buckling portion; a height of the locking elastic arm is greater than the height of the first wall portion; and the height of the locking elastic arm is greater than the height of the second wall portion; the locking structures include the locking elastic arm; after the first connector is mated with the second connector, the first insulating body is at least partially received in the receiving chamber, the second conductive terminals are in contact with the first conductive elements, and the first connector and the second connector are locked with each other through the locking structures; when the first connector and the second connector need to be unlocked, the unlocking slider reaches the unlocking position, the unlocking slider abuts against the locking structures to unlock the first connector and the second connector.

Compared with the prior art, the present disclosure performs unlocking by the unlocking slider, which improves the convenience and consistency of unlocking, and avoids damage to a locking elastic arm due to different unlocking forces.

DETAILED DESCRIPTION

Figure 1:
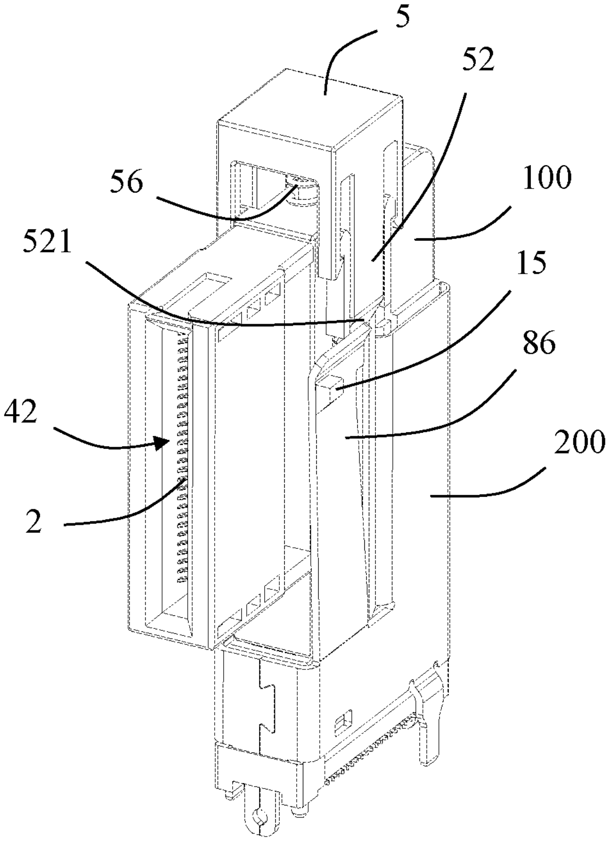
FIG. 1 is a schematic perspective view of a connector assembly in accordance with a first embodiment of the present disclosure, wherein a first connector and a second connector are in a locked state.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms “a”, “said”, and “the” used in this application and the appended claims are also intended to include plural forms unless the context clearly indicates other meanings.

It should be understood that the terms “first”, “second” and similar words used in the specification and claims of this application do not represent any order, quantity or importance, but are only used to distinguish different components. Similarly, “an” or “a” and other similar words do not mean a quantity limit, but mean that there is at least one; “multiple” or “a plurality of” means two or more than two. Unless otherwise noted, “front”, “rear”, “lower” and/or “upper” and similar words are for ease of description only and are not limited to one location or one spatial orientation. Similar words such as “include” or “comprise” mean that elements or objects appear before “include” or “comprise” cover elements or objects listed after “include” or “comprise” and their equivalents, and do not exclude other elements or objects. The term “a plurality of” mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIG. 1 to FIG. 19, an illustrated embodiment of the present disclosure discloses a connector assembly, which includes a first connector 100 and a second connector 200 that are mateable with each other. In the illustrated embodiment of the present disclosure, the first connector 100 is configured to receive a mating element (such as an electronic card, not shown). The second connector 200 is configured to be mounted on a bottom circuit board (not shown). Referring to FIG. 1 and FIG. 8, the first connector 100 is configured to be mated with the second connector 200 along a mating direction M. That is, the first connector 100 is configured to be at least partially inserted into the second connector 200 along the mating direction M, so as to realize the electrical connection between the first connector 100 and the second connector 200. In the illustrated embodiment of the present disclosure, the mating direction M is a direction from top to bottom. The first connector 100 and the second connector 200 are provided with locking structures that are lockable with each other after mating, so as to improve the mating stability thereof.

Referring to FIGS. 8 to 13, the first connector 100 includes a first insulating body 1, a mating insulating protrusion 4, a plurality of first conductive terminals 2 fixed to the mating insulating protrusion 4, a built-in circuit board 3 electrically connected to the first conductive terminals 2, an unlocking slider 5 installed on the first insulating body 1, and an elastic member 56 mounted between the unlocking slider 5 and the first insulating body 1. In the illustrated embodiment of the present disclosure, the first insulating body 1 extends along a first direction A1-A1 (for example, a top-bottom direction) parallel to the mating direction M. The mating insulating protrusion 4 extends along a second direction A2-A2 (for example, a front-rear direction) perpendicular to the first direction A1-A1. In other words, an extending direction of the mating insulating protrusion 4 is perpendicular to an extending direction of the first insulating body 1. The mating insulating protrusion 4 is integrated with the first insulating body 1 to improve the structural strength. The first insulating body 1 covers part of the built-in circuit board 3 to improve the structural strength of the first connector 100.

Referring to FIG. 8 to FIG. 13, the mating insulating protrusion 4 includes a first mating surface 41, a first mating slot 42 extending forwardly through the first mating surface 41 along the first direction A1-A1, a first side wall 43 (for example, a right side wall) located on one side of the first mating slot 42, and a second side wall 44 (for example, a left side wall) located on the other side of the first mating slot 42. The first mating slot 42 is configured for insertion of an electronic card.

In the illustrated embodiment of the present disclosure, the first conductive terminals 2 are arranged in two rows on left and right sides of the first mating slot 42, in which one row of first conductive terminals 2 is mounted on an inner side of the first side wall 43, and the other row of first conductive terminals 2 is mounted on an inner side of the second side wall 44. Each first conductive terminal 2 includes a first mating portion 21 protruding into the first mating slot 42 and a first tail portion (not shown) electrically connected to the built-in circuit board 3. The first mating portions 21 are configured to contact gold fingers on the electronic card to realize the electrical connection between the two. In an embodiment of the present disclosure, the electronic card has two rows of gold fingers which are located on two opposite surfaces of the electronic card, respectively. Each first mating portion 21 has a certain degree of elasticity. By providing two rows of first conductive terminals 2, the first mating portions 21 of the two rows of first conductive terminals 2 can provide a certain clamping force for the electronic card, so that the electronic card can be better held in the first mating slot 42, thereby reducing the risk of the electronic card getting loose. It is understandable to those skilled in the art that, in one embodiment, each first tail portion is arc-shaped and has a certain degree of elasticity, so as to clamp the built-in circuit board 3. The first tail portions are in contact with gold pads (not shown) on the built-in circuit board 3 to realize electrical connection between the two. Certainly, in other embodiments, the first conductive terminals 2 may also be arranged in a single row. Accordingly, the golden fingers of the electronic card are arranged in a single row.

The first insulating body 1 includes a first side wall portion 11, a second side wall portion 12, a top wall 13 connecting one end of the first side wall portion 11 and one end of the second side wall portion 12, and a bottom wall 14 connecting the other end of the first side wall portion 11 and the other end of the second side wall portion 12. The top wall 13 has a top surface 131, and the bottom wall 14 has a bottom surface 141.

Figure 11:
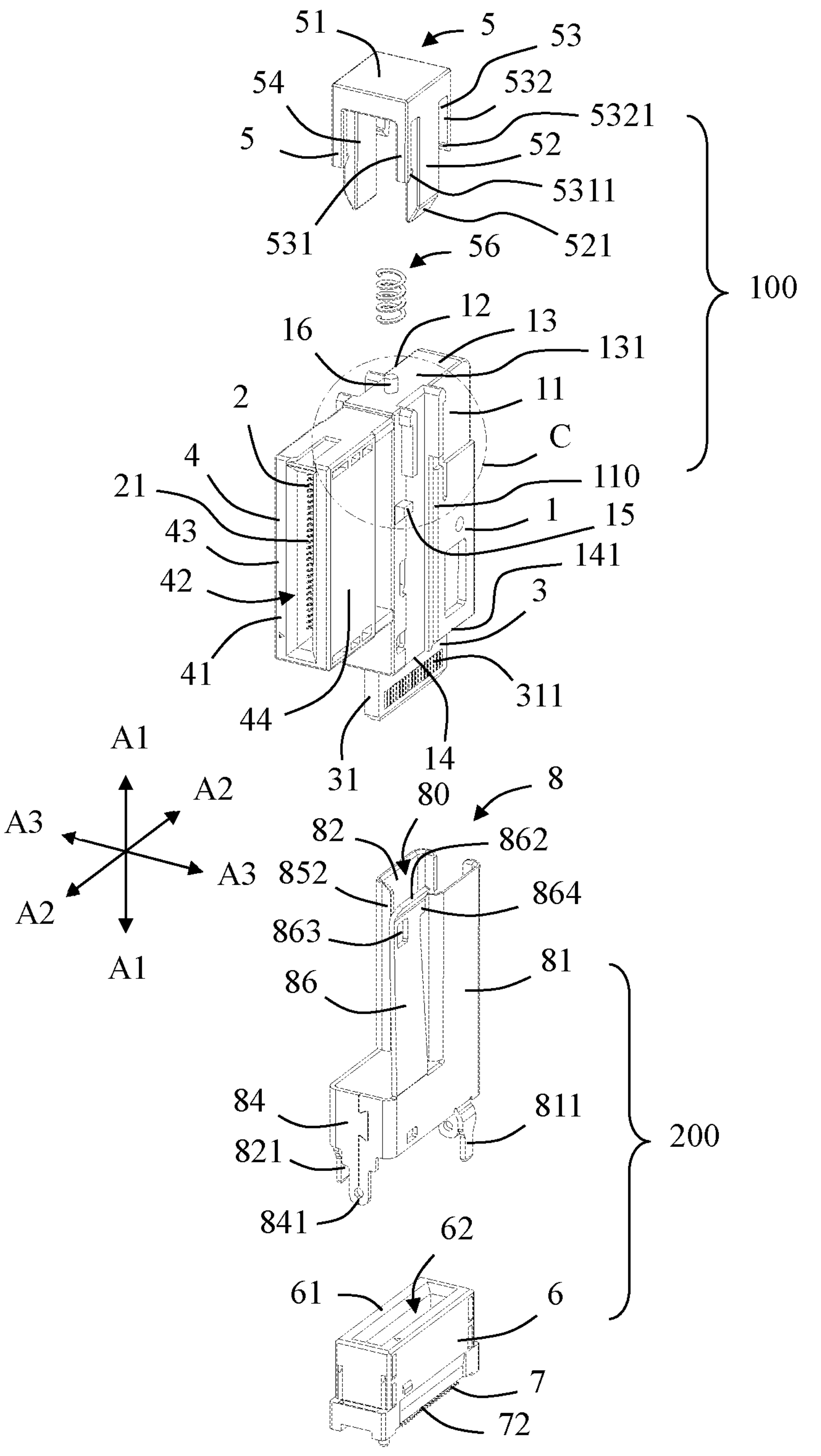
FIG. 11 is a further perspective exploded view of the connector assembly in FIG. 8.
Figure 13:
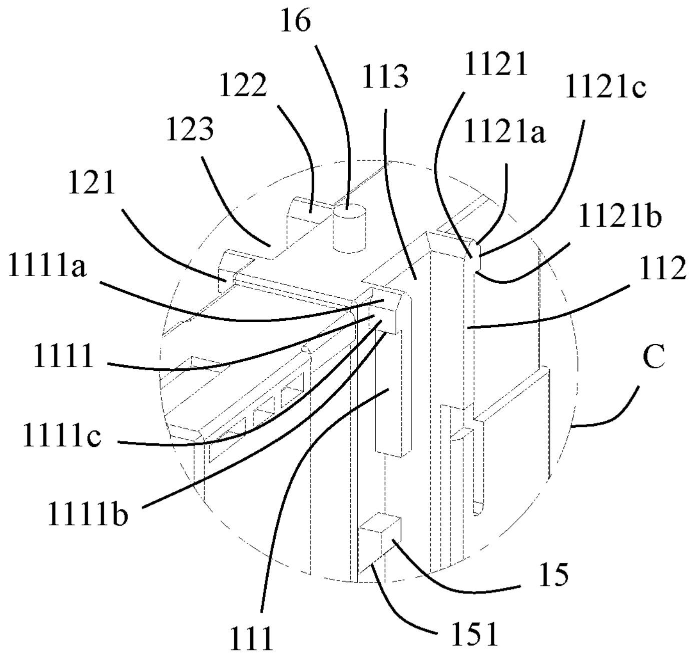
FIG. 13 is a partial enlarged view of a circled portion C in FIG. 11.
Figure 14:
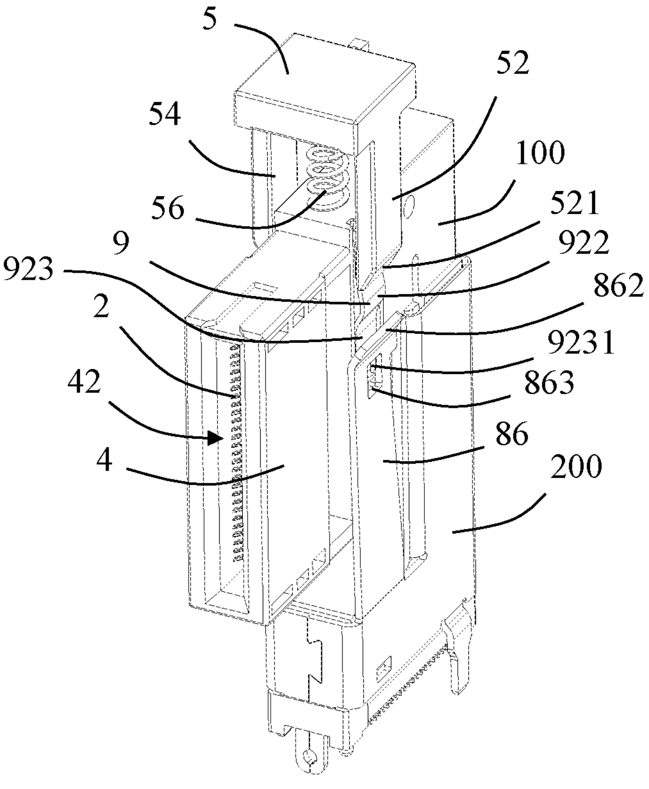
FIG. 14 is a schematic perspective view of the connector assembly in accordance with a second embodiment of the present disclosure, wherein the first connector and the second connector are in a locked state.
Figure 15:
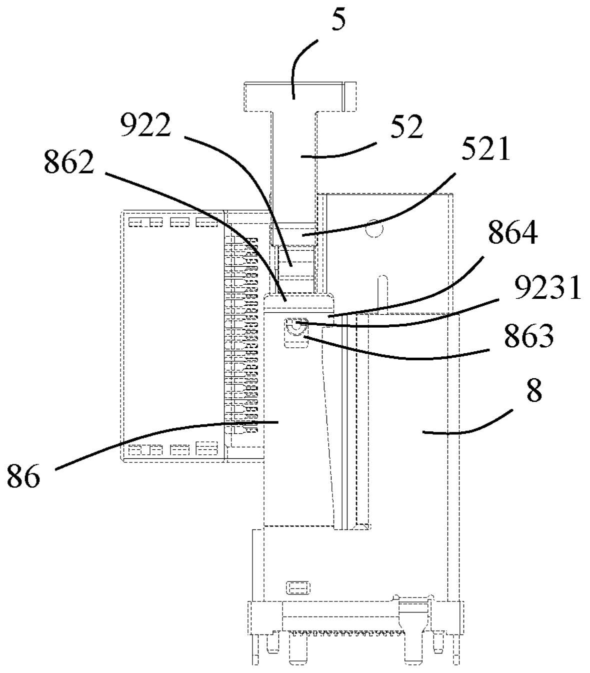
FIG. 15 is a right view of FIG. 14.
Figure 16:
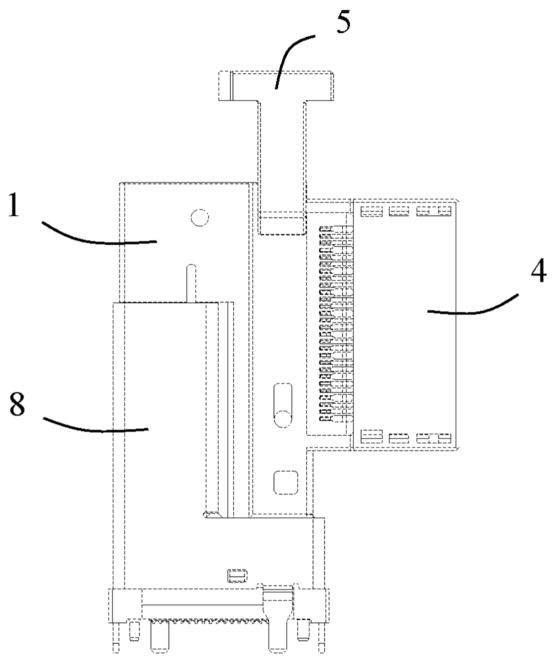
FIG. 16 is a left view of FIG. 14.
Figure 17:
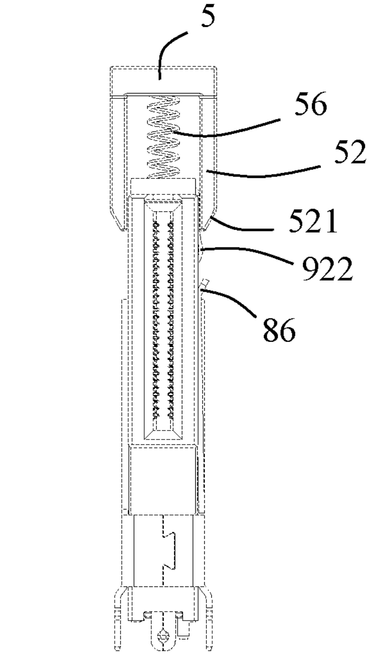
FIG. 17 is a front view of FIG. 14, wherein the unlocking slider is in the initial position.
Figure 18:
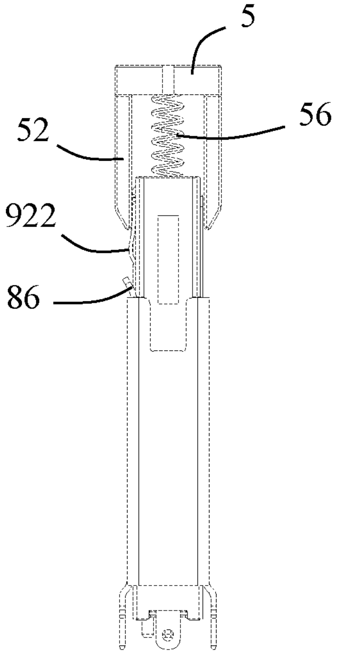
FIG. 18 is a rear view of FIG. 14.
Figure 19:
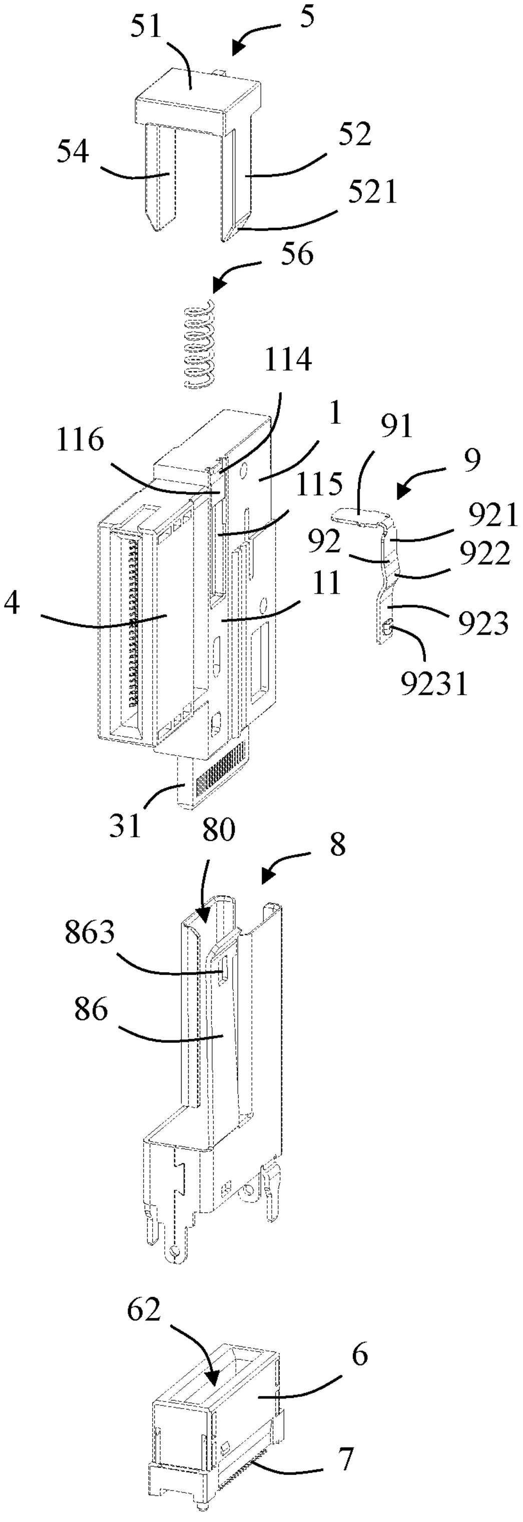
FIG. 19 is a partially exploded perspective view of the connector assembly in FIG. 1.

Referring to FIG. 11 and FIG. 13, in the embodiment shown in the present disclosure, the first side wall portion 11 is provided with a first raised rib 111, a second raised rib 112, and a first slide groove 113 located between the first raised rib 111 and the second raised rib 112. The first raised rib 111 and the second raised rib 112 generally extend along the first direction A1-A1. The first raised rib 111 and the second raised rib 112 extend close to the top surface 131 of the top wall 13. Specifically, the first raised rib 111 includes a first protrusion 1111. The second raised rib 112 includes a second protrusion 1121. The first protrusion 1111 includes a first guide inclined surface 1111*a* at the top, a first locking surface 1111*b* at the bottom, and a first vertical surface 1111*c* connecting the first guide inclined surface 1111*a* and the first locking surface 1111*b*. The second protrusion 1121 includes a second guide inclined surface 1121*a* at the top, a second locking surface 1121*b* at the bottom, and a second vertical surface 1121*c* connecting the second guide inclined surface 1121*a* and the second locking surface 1121*b*. The first side wall portion 11 includes a locking portion. In the illustrated embodiment of the present disclosure, the locking portion includes the first locking surface 1111*b* and the second locking surface 1121*b*.

The second side wall portion 12 is provided with a third raised rib 121, a fourth raised rib 122, and a second slide groove 123 located between the third raised rib 121 and the fourth raised rib 122. The third raised rib 121, the fourth raised rib 122 and the second slide groove 123 of the second side wall 12 are symmetrically arranged with respect to the first raised rib 111, the second raised rib 112 and the first slide groove 113 of the first side wall 11 on opposite sides of the first insulating body 1, which will not be repeated here.

Figure 12:
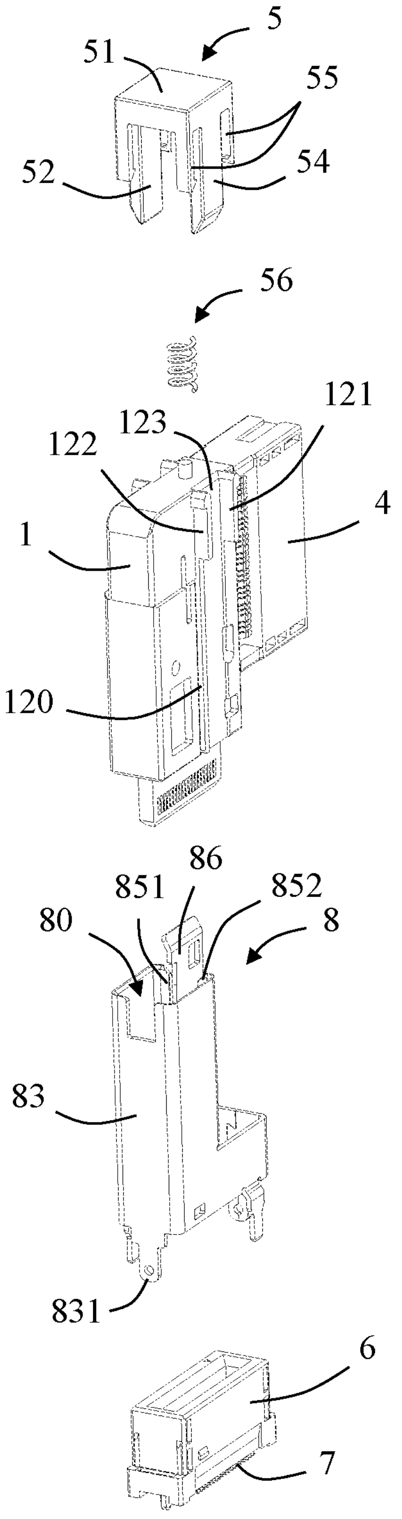
FIG. 12 is a perspective exploded view of FIG. 11 at another angle.

In addition, as shown in FIG. 11 and FIG. 12, the first side wall portion 11 defines a first slit 110 extending along the first direction A1-A1. The second sidewall portion 12 defines a second slit 120 extending along the first direction A1-A1.

Figure 9:
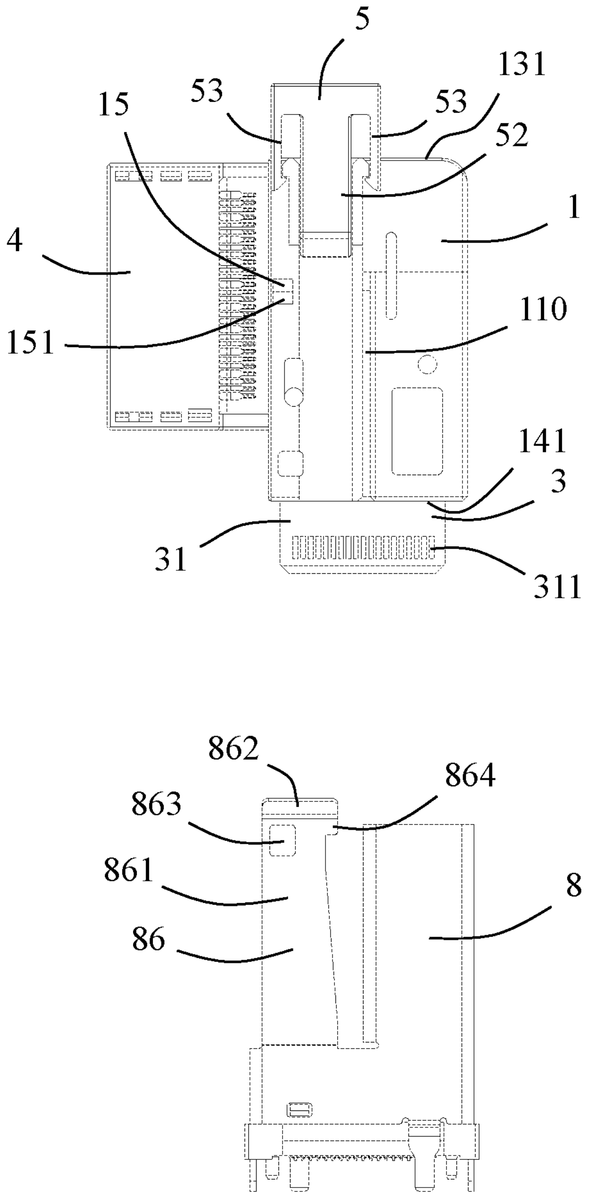
FIG. 9 is a right side view of FIG. 8.
Figure 10:
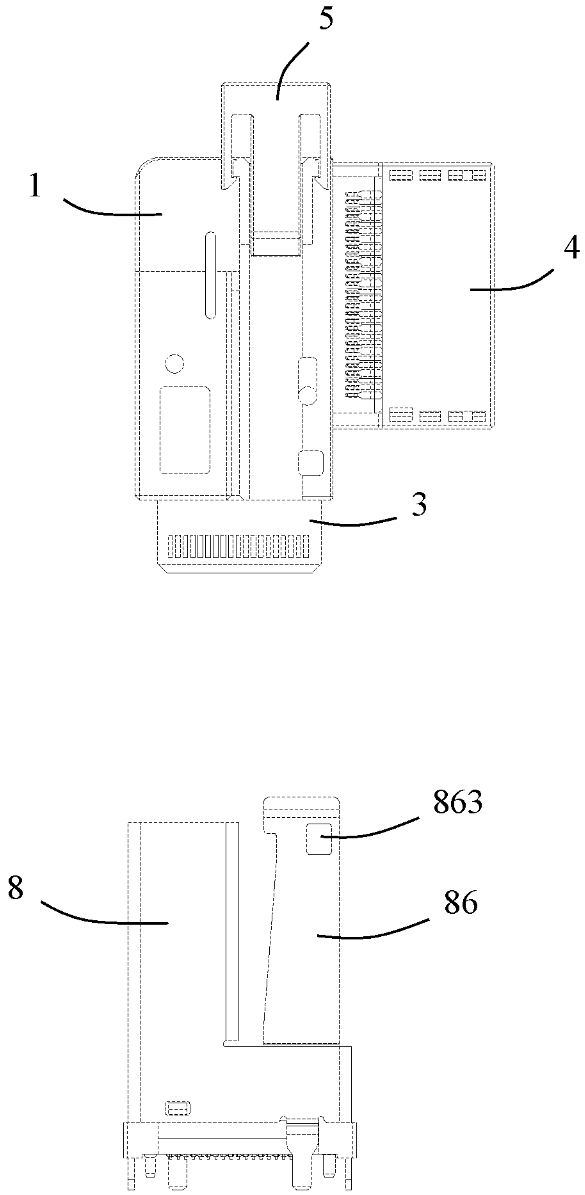
FIG. 10 is a left view of FIG. 8.

In the illustrated embodiment of the present disclosure, the first insulating body 1 is further provided with a locking protrusion 15. The locking protrusion 15 includes a guide inclined surface 151 at the bottom. In the illustrated embodiment of the present disclosure, the locking protrusion 15 is disposed on the first side wall portion 11. The locking protrusion 15 is integrally formed with the first side wall portion 11. Of course, in other embodiments, the locking protrusion can also be made separately from the first side wall portion 11, and then assembled and fixed to the first side wall portion 11. Referring to FIG. 9, in the illustrated embodiment of the present disclosure, the locking protrusion 15 is located at a middle and upper portion of the first side wall portion 11. That is, the locking protrusion 15 is closer to the top surface 131 of the first sidewall portion 11 than the bottom surface 141 of the first sidewall portion 11. In the embodiment shown in the present disclosure, since the first insulating body 1 is approximately vertical, and its height along the first direction A1-A1 is relatively large; by arranging the locking protrusion 15 at the middle and upper portion of the first side wall portion 11, after the first connector 100 and the second connector 200 are mated, the first connector 100 can be better held in the second connector 200 through the locking structures, thereby reducing the risk of the first connector 100 being damaged due to external force.

In the illustrated embodiment of the present disclosure, the first insulating body 1 further includes a positioning post 16 integrally formed with the top wall 13 and protruding upwardly from the top surface 131. Of course, in other embodiments, the positioning post 16 can also be made separately from the first insulating body 1, and then assembled and fixed to the first insulating body 1.

Referring to FIG. 11 and FIG. 12, the unlocking slider 5 includes a pressing portion 51, an unlocking protrusion 52 extending from one side of the pressing portion 51, a locking arm 53 extending from one side of the pressing portion 51, a guide protrusion 54 extending from the other side of the pressing portion 51, and a latching arm 55 extending from the other side of the pressing portion 51. In the illustrated embodiment of the present disclosure, the unlocking protrusion 52 and the locking arm 53 are symmetrically arranged with respect to the guide protrusion 54 and the latching arm 55, respectively, on opposite sides of the unlocking slider 5. Hereinafter, only the unlocking protrusion 52 and the locking arm 53 located on the same side are taken as an example for description.

In the illustrated embodiment of the present disclosure, the locking arm 53 includes a first locking arm 531 and a second locking arm 531 which are respectively located on opposite sides of the unlocking protrusion 52 in the second direction A2-A2. The unlocking protrusion 52 extends downwardly along the first direction A1-A1 to protrude beyond the first locking arm 531 and the second locking arm 532. The unlocking protrusion 52 includes an inclined surface 521 at an end of the unlocking protrusion 52. By setting the inclined surface 521, a free end of the unlocking protrusion 52 is contracted, and this structure facilitates insertion into the locking structures for unlocking.

The first locking arm 531 includes a first hook portion 5311 located at a free end of the first locking arm 531. The second locking arm 532 includes a second hook portion 5321 located at a free end of the second locking arm 532. Both the first hook portion 5311 and the second hook portion 5321 protrude toward a side where the unlocking protrusion 52 is located.

In the illustrated embodiment of the present disclosure, the elastic member 56 is a spring. The elastic member 56 is installed between the unlocking slider 5 and the first insulating body 1. Of course, those skilled in the art can understand that the elastic member 56 can also be in other forms (such as an elastic piece), as long as the elastic member 56 can provide a restoring force for the unlocking slider 5.

Figure 3:
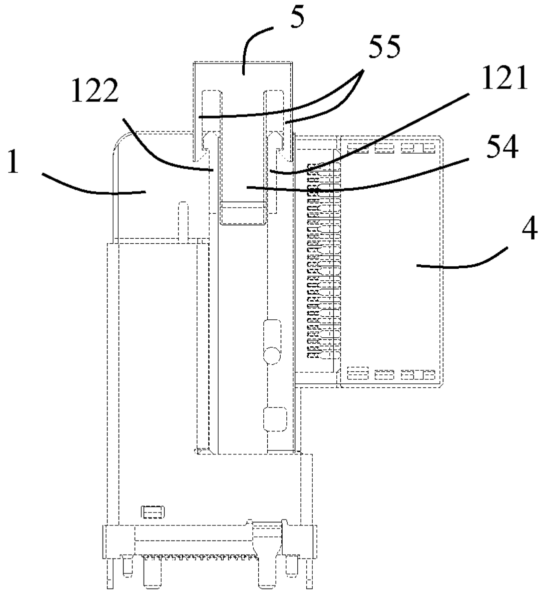
FIG. 3 is a left view of FIG. 1.

During assembly, the spring is sleeved on the positioning post 16. Then, the unlocking slider 5 is installed on the first insulating body 1. During this process, the unlocking protrusion 52 is correspondingly inserted into the first slide groove 113, the guide protrusion 54 is correspondingly inserted into the second slide groove 123, and the free end of the first locking arm 531 and the free end of the second locking arm 532 correspond to the first guide inclined surface 1111*a* and the second guide inclined surface 1121*a*, respectively. With the further installation of the unlocking slider 5, the first locking arm 531 and the second locking arm 532 deform outwardly on the first guide inclined surface 1111*a* and the second guide inclined surface 1121*a*, respectively. Then, the first locking arm 531 and the second locking arm 532 slide downwardly along the first vertical surface 1111*c* and the second vertical surface 1121*c*, respectively. Finally, the first hook portion 5311 and the second hook portion 5321 cross over the first vertical surface 1111*c* and the second vertical surface 1121*c*, respectively, so as to lock on the first locking surface 1111*b* and the second locking surface 1121*b*, respectively. At the same time, as shown in FIG. 3, the latching arm 55 is locked on the third raised rib 121 and the fourth raised rib 122 to reduce the risk of the unlocking slider 5 falling off from the first insulating body 1.

Figure 4:
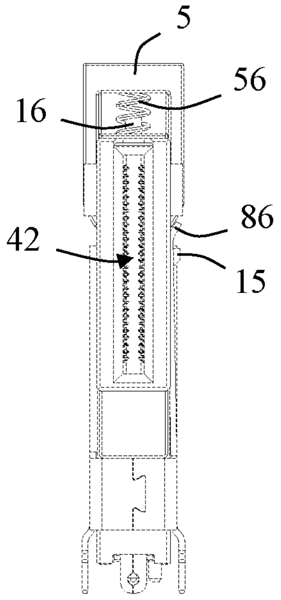
FIG. 4 is a front view of FIG. 1, wherein an unlocking slider is in an initial position.
Figure 5:
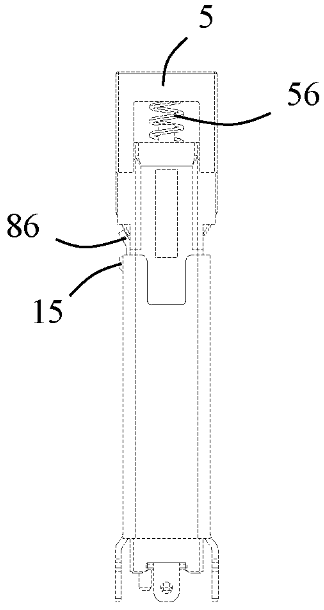
FIG. 5 is a rear view of FIG. 1.

In one embodiment of the present disclosure, when the unlocking slider 5 is fully assembled on the first insulating body 1, the elastic member 56 exerts a certain upward force on the unlocking slider 5 to keep the unlocking slider 5 at the initial position (corresponding to a position of the unlocking slider 5 in FIG. 4). The unlocking protrusion 52 is restricted between the first raised rib 111 and the second raised rib 112 along the second direction A2-A2. The guide protrusion 54 is restricted between the third raised rib 121 and the fourth raised rib 122 along the second direction A2-A2. In this way, when a force is applied, the unlocking protrusion 52 is slidable along the first direction A1-A1 more accurately, without inappropriate deflection or the like.

In the embodiment illustrated in the present disclosure, the unlocking slider 5 is slidable between the initial position and an unlocking position (corresponding to a position of the unlocking slider 5 in FIG. 6 and FIG. 7) along the first direction A1-A1, which will be described in detail later.

As shown in FIG. 9, the built-in circuit board 3 includes a tongue plate 31 protruding beyond the bottom surface 141 of the first insulating body 1. The first connector 100 includes a plurality of first conductive elements for mating with the second connector 200. In the illustrated embodiment of the present disclosure, the plurality of first conductive elements are a plurality of mating metal pads 311 formed on at least one surface of the tongue plate 31. Of course, those skilled in the art can understand that in other embodiments, the plurality of first conductive elements may also be conductive terminals fixed to the first insulating body 1.

Referring to FIGS. 8 to 12, the second connector 200 includes a second insulating body 6, a plurality of of second conductive terminals 7 fixed to the second insulating body 6, and a metal shell 8 covering the second insulating body 6. The second insulating body 6 includes a second mating surface 61 and a second mating slot 62 extending through the second mating surface 61. The tongue plate 31 is inserted into the second mating slot 62 along the mating direction M. Each second conductive terminal 7 includes a second mating portion (not shown) extending into the second mating slot 62 and a second tail portion 72 for being mounted to the bottom circuit board. In one embodiment of the present disclosure, the second conductive terminals 7 are disposed in two rows. These two rows of second conductive terminals 7 can provide a certain clamping force to the tongue plate 31 of the built-in circuit board 3, so that the tongue plate 31 can be better kept in the second mating slot 62, thereby improving the mating reliability between the first connector 100 and the second connector 200.

The metal shell 8 includes a first wall portion 81, a second wall portion 82 opposite to the first wall portion 81, a connecting portion 83 connecting the first wall portion 81 and the second wall portion 82, a buckling portion 84 locking the first wall portion 81 and the second wall portion 82, and a receiving chamber 80 located between the first wall portion 81 and the second wall portion 82. In one embodiment of the present disclosure, the metal shell 8 is formed by stamping, bending and buckling a metal sheet. Fastening structures (such as dovetail grooves and protrusions that cooperate with each other) are provided on the buckling portion 84. The buckling portion 84 and the connecting portion 83 are located at two sides of the receiving chamber 80. A height of the buckling portion 84 is lower than that of the connecting portion 83. The first wall portion 81, the second wall portion 82, the connecting portion 83 and the buckling portion 84 cover outer walls of the second insulating body 6, realizing the mutual fixing of the metal shell 8 and the second insulating body 6.

Specifically, the first wall portion 81 includes a first mounting tail 811 extending downwardly and toward a side away from the second wall portion 82. The second wall portion 82 includes a second mounting tail 821 extending downwardly and toward a side away from the first wall portion 81. The connecting portion 83 includes a third mounting tail 831 extending downwardly. The buckling portion 84 includes a fourth mounting tail 841 extending downwardly. The first mounting tail 811, the second mounting tail 821, the third mounting tail 831 and the fourth mounting tail 841 are configured to be mounted on the bottom circuit board. Referring to FIG. 9 and FIG. 11, in the embodiment shown in the present disclosure, in order to further improve the structural strength, a height of the first wall portion 81, a height of the second wall portion 82, and a height of the connecting portion 83 should be set as large as possible. The connecting portion 83 has the same height as the first wall portion 81 and the second wall portion 82. The height of the first wall portion 81 is greater than a height of the locking portion 84. The height of the second wall portion 82 is greater than the height of the locking portion 84. The height of the connecting portion 83 is greater than the height of the locking portion 84. A height of the locking elastic arm 86 is greater than the height of the first wall portion 81. The height of the locking elastic arm 86 is greater than the height of the second wall portion 82. The height of the locking elastic arm 86 is greater than the height of the connecting portion 83.

The metal shell 8 further includes a first tab 851 bent from the first wall 81 toward the second wall 82, and a second tab 852 bent from the second wall portion 82 toward the first wall portion 81. The first tab 851 and the second tab 852 are respectively inserted into the first slit 110 and the second slit 120 along the first direction A1-A1. The metal shell 8 further includes a locking elastic arm 86 extending upwardly from the first wall portion 81. In the illustrated embodiment of the present disclosure, the locking elastic arm 86 is in a shape of a cantilever, which includes a main body 861, an inclined portion 862 bent outwardly from the main body 861, and a locking hole 863 used for receiving the locking protrusion 15. The locking hole 863 is located adjacent to the free end of the locking elastic arm 86 so as to keep the elasticity of the locking elastic arm 86 as much as possible. In the illustrated embodiment of the present disclosure, the locking elastic arm 86 extends upwardly and protrudes beyond the first wall portion 81, the second wall portion 82 and the connecting portion 83, in order to increase the length of the locking elastic arm 86, thereby improving the elastic deformation capacity of the locking elastic arm 86. The locking hole 863 is at least partially disposed on the main body 861 and located adjacent to the inclined portion 862. The locking elastic arm 86 includes a widened portion 864 located at the free end of the locking elastic arm 86, wherein the inclined portion 862 is located on the widened portion 864.

In a first embodiment of the present disclosure, the locking structures include the locking protrusion 15 provided on the first insulating body 1 and the locking elastic arm 86 provided on the second connector 200.

When the first connector 100 is mated with the second connector 200, the first tab 851 and the second tab 852 are inserted into the first slit 110 and the second slit 120, respectively. The relative position of the locking elastic arm 86 changes relative to the locking protrusion 15 along the guide inclined surface 151 of the locking protrusion 15.

Figure 2:
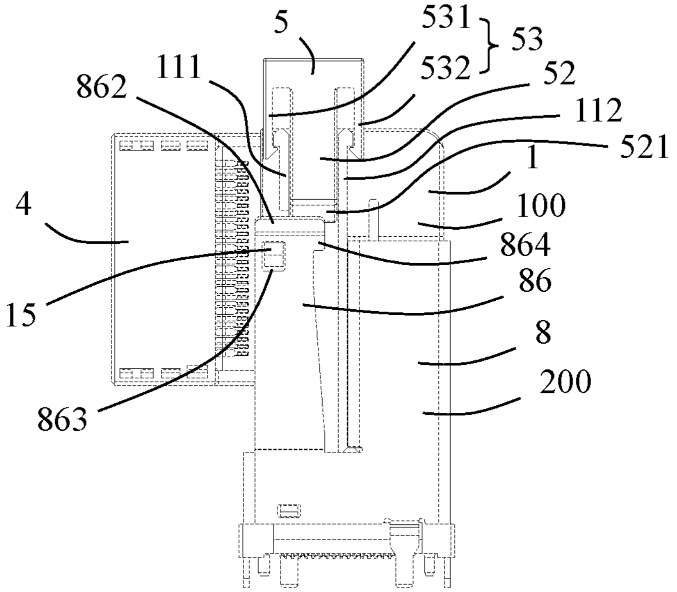
FIG. 2 is a right view of FIG. 1.

When the first connector 100 is mated with the second connector 200, the locking elastic arm 86 rebounds, so that the locking protrusion 15 is locked in the locking hole 863, thereby preventing the first connector 100 from being disengaged from the second connector 200 in a direction opposite to the mating direction M. At this time, the tongue plate 31 of the first connector 100 and part of the first insulating body 1 are accommodated in the second connector 200. The tongue plate 31 is inserted into the second mating slot 62 to achieve electrical connection with the second conductive terminals 7. Part of the first insulating body 1 is accommodated in the receiving chamber 80. Referring to FIG. 2, at this moment, the end of the unlocking protrusion 52 at least partially enters an area where the locking elastic arm 86 is located. In other words, at this moment, the end of the unlocking protrusion 52 and the inclined portion 862 of the locking elastic arm 86 are at least partially overlapped when viewed along a third direction A3-A3 (for example, a left-right direction). The third direction A3-A3 is perpendicular to the first direction A1-A1 and the second direction A2-A2. Such an arrangement ensures that the movement of the unlocking protrusion 52 can accurately abut against the locking elastic arm 86 during unlocking, thereby improving the reliability of unlocking. In addition, by providing the widened portion 864, an overlapping area between the unlocking protrusion 52 and the locking elastic arm 86 is increased. This increases the probability that the unlocking protrusion 52 is able to push against the locking elastic arm 86 when unlocking, thereby improving the reliability of unlocking.

In use, the mating element (such as the electronic card) is inserted into the first mating slot 42 along the second direction A2-A2, which will impose an insertion force on the first connector 100 along the second direction A2-A2. In the illustrated embodiment of the present disclosure, the first tab 851 and the second tab 852 are fixed and positioned in the first slit 110 and the second slit 120, respectively, which improves the integrity of the connector assembly, and reduces the possible adverse effects of the insertion force on the connector assembly. In addition, by elevating the first wall portion 81, the second wall portion 82 and the connecting portion 83, the connecting portion 83 can better stop the first connector 100, thereby further reducing the possible adverse effect of the insertion force on the connector assembly. For example, the risk of the insertion force causing the second connector 200 to be loosened at the soldering or welding position of the bottom circuit board is reduced, and the risk of poor contact between the mating metal pads 311 of the tongue plate 31 and the second conductive terminals 7 is also reduced.

Figure 6:
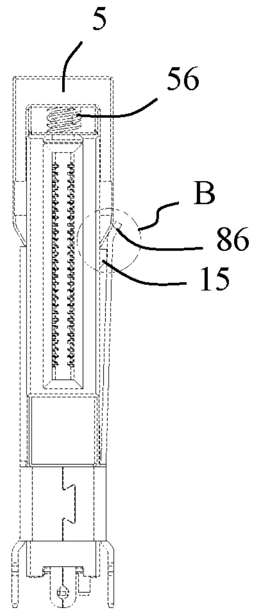
FIG. 6 is a front view of FIG. 4 in another state, wherein the unlocking slider is in an unlocked position.
Figure 7:
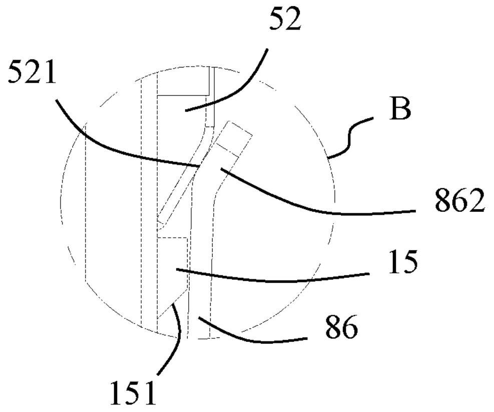
FIG. 7 is a partially enlarged view of a circled portion B in FIG. 6.
Figure 8:
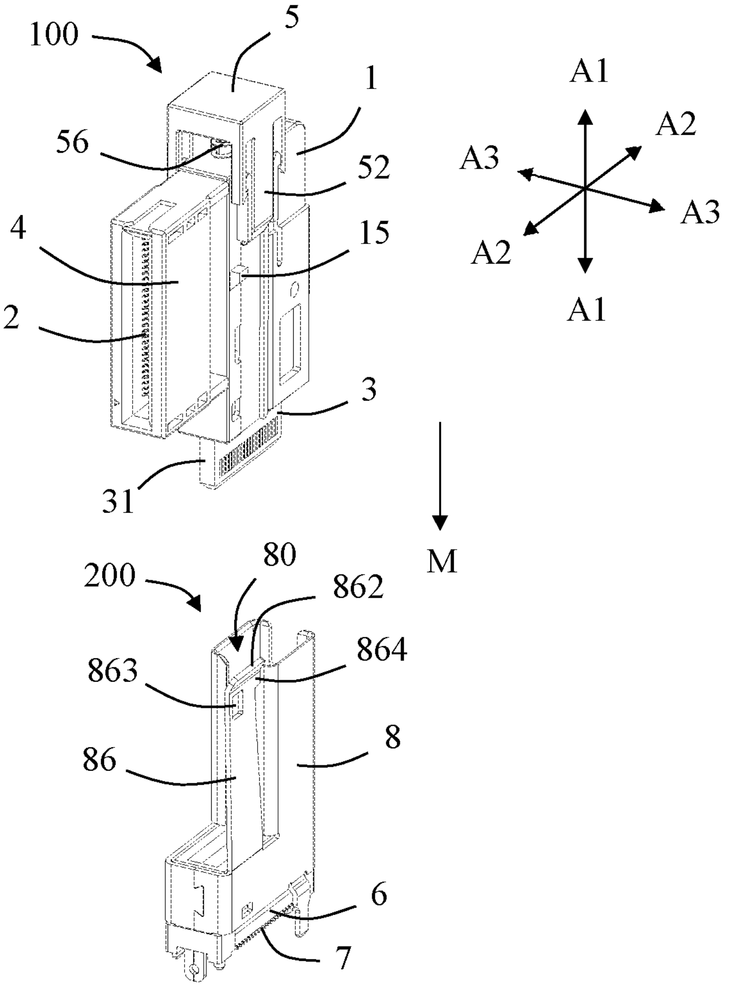
FIG. 8 is a partial perspective exploded view of the connector assembly in FIG. 1, wherein the first connector and the second connector are separated from each other.

Referring to FIG. 1 to FIG. 7, when unlocking is required, a downward pressing force is applied to the unlocking slider 5, so that the unlocking slider 5 slides downwardly from the initial position to the unlocking position. Referring to FIG. 6 and FIG. 7, when the unlocking slider 5 reaches the unlocking position, the unlocking slider 5 abuts against the locking structures to release a locking between the first connector 100 and the second connector 200.

Specifically, when the unlocking slider 5 slides from the initial position to the unlocking position, the elastic member 56 is further compressed. The locking arm 53 is disengaged from the locking portion downwards. The end of the unlocking slider 5 abuts against the inclined portion 862, so that the locking elastic arm 86 is deformed outwardly. As a result, the locking protrusion is finally disengaged from the locking hole 863, thereby achieving unlocking. At this time, the elastic member 56 exerts a restoring force on the unlocking slider 5 to return from the unlocking position to the initial position. When the external force pressing the unlocking slider 5 is removed, the unlocking slider 5 can return to the initial position under the action of the elastic member 56.

Referring to FIG. 14 to FIG. 19, the present disclosure also discloses a connector assembly in a second embodiment. The connector assembly includes a first connector 100 and a second connector 200. The second connector 200 in the second embodiment is the same as the second connector 200 in the first embodiment, which will not be repeated in the present disclosure. The following only describes the differences between the first connector 100 in the second embodiment and the first connector 100 in the first embodiment.

The first connector 100 in the second embodiment includes a first insulating body 1, a mating insulating protrusion 4, a plurality of first conductive terminals 2 fixed to the mating insulating protrusion 4, a built-in circuit board 3 electrically connected to the first conductive terminals 2, an unlocking slider 5 installed on the first insulating body 1, an elastic member 56 located between the unlocking slider 5 and the first insulating body 1, and a locking piece 9 fixed to the first insulating body 1.

The first side wall portion 11 of the first insulating body 1 includes a mounting groove 114, a receiving groove 115 and an abutment boss 116 located in the receiving groove 115.

The locking piece 9 is made of metal sheet and is roughly L-shaped. The locking piece 9 includes a mounting portion 91 fixed in the mounting groove 114, and an extension arm 92 connected with the mounting portion 91 and is substantially perpendicular to the mounting portion 91. The extension arm 92 is at least partially received in the receiving groove 115. The extension arm 92 includes a supporting portion 921 located adjacent to the mounting portion 91 and supported on the abutment boss 116, a raised portion 922 extending from the supporting portion 921 away from the mounting portion 91, and an extension portion 923 extending from the raised portion 922 and away from the raised portion 922. A locking protrusion 9231 is stamped on the extension portion 923.

In the illustrated embodiment of the present disclosure, the elastic member 56 is a spring. The elastic member 56 is installed between the unlocking slider 5 and the first insulating body 1. Of course, those skilled in the art can understand that the elastic member 56 can also be in other forms (such as an elastic piece), as long as the elastic member 56 can provide a restoring force for the unlocking slider 5.

The unlocking slider 5 includes a pressing portion 51, an unlocking protrusion 52 extending from one side of the pressing portion 51, and a guide protrusion 54 extending from the other side of the pressing portion 51. In the illustrated embodiment of the present disclosure, the unlocking protrusion 52 and the guide protrusion 54 are symmetrically arranged on opposite sides of the unlocking slider 5. The unlocking protrusion 52 includes an inclined surface 521 at the end of the unlocking protrusion 52.

In the second embodiment shown in the present disclosure, the locking structures include the locking piece 9 fixed to the first insulating body 1 and having the locking protrusion 9231, and the locking elastic arm 86 provided on the second connector 200.

When unlocking is required, a downward pressing force is applied to the unlocking slider 5 to make the unlocking slider 5 slide downwardly from the initial position to the unlocking position. When the unlocking slider 5 reaches the unlocking position, the unlocking slider 5 abuts against the locking structures to release a locking between the first connector 100 and the second connector 200.

Specifically, when the unlocking slider 5 slides from the initial position to the unlocking position, the elastic member 56 is further compressed, and the unlocking slider 5 presses against the raised portion 922. The extension portion 923 moves toward an inside of the first insulating body 1 in the receiving groove 115, so that the locking protrusion 9231 is disengaged from the locking hole 863 of the locking elastic arm 86, thereby achieving unlocking. At this time, the elastic member 56 exerts a restoring force on the unlocking slider 5 to return from the unlocking position to the initial position. When the external force pressing the unlocking slider 5 is removed, the unlocking slider 5 can return to the initial position under the action of the elastic member 56.

Compared with the prior art, the present disclosure uses the unlocking slider 5 to unlock, which improves the convenience and consistency of unlocking, and avoids damage to the locking elastic arm 86 due to different unlocking forces.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. A first connector, configured to mate with a second connector along a mating direction, the first connector and the second connector being provided with locking structures that lock with each other after mating, the first connector comprising:

a first insulating body;

a plurality of first conductive elements; and an unlocking slider slidable between an initial position and an unlocking position;

when the unlocking slider reaches the unlocking position, the unlocking slider abuts against at least one of the locking structures, so as to release a locking between the first connector and the second connector; and wherein the first connector comprises a built-in circuit board fixed to the first insulating body, the built-in circuit board comprises a tongue plate protruding beyond the first insulating body, and the plurality of first conductive elements are a plurality of mating metal pads formed on at least one surface of the tongue plate.

2. The first connector according to claim 1, wherein the unlocking slider is installed on the first insulating body.

3. The first connector according to claim 2, wherein the first connector comprises an elastic member, and the elastic member is configured to exert a restoring force on the unlocking slider to return from the unlocking position to the initial position when the unlocking slider is in the unlocking position.

4. The first connector according to claim 3, wherein the elastic member is a spring; and the elastic member is installed between the unlocking slider and the first insulating body.

5. The first connector according to claim 3, wherein the unlocking slider is provided with a locking arm, and the first insulating body is provided with a locking portion; when the unlocking slider is at the initial position, the locking arm and the locking portion are locked with each other, and at this time the elastic member applies force to the unlocking slider.

6. The first connector according to claim 5, wherein the unlocking slider comprises a pressing portion and an unlocking protrusion extending from the pressing portion; the elastic member is installed between the pressing portion and the first insulating body; and the unlocking protrusion comprises an inclined surface at an end of the unlocking protrusion.

7. The first connector according to claim 6, wherein the first insulating body comprises a first raised rib, a second raised rib, and a first slide groove located between the first raised rib and the second raised rib;

when the unlocking slider slides along a first direction parallel to the mating direction, the unlocking protrusion slides in the first slide groove along the first direction; and the unlocking protrusion is limited between the first raised rib and the second raised rib in a second direction perpendicular to the first direction.

8. The first connector according to claim 7, wherein the locking arm extends from the pressing portion, the locking arm comprises a first locking arm and a second locking arm, the unlocking protrusion extends beyond the first locking arm and the second locking arm along the first direction;

the first locking arm comprises a first hook portion located at a free end of the first locking arm; the second locking arm comprises a second hook portion located at a free end of the second locking arm; both the first hook portion and the second hook portion protrude toward a side where the unlocking protrusion is located;

the first raised rib comprises a first protrusion, the second raised rib comprises a second protrusion, the locking portion comprises a first locking surface located on the first protrusion and a second locking surface located on the second protrusion; and the first hook portion mates with the first locking surface; and the second hook portion mates with the second locking surface.

9. The first connector according to claim 1, wherein the locking structures comprise a locking protrusion provided on the first insulating body and a locking elastic arm provided on the second connector, the locking elastic arm is provided with a locking hole to receive the locking protrusion, and the locking hole is located adjacent to a free end of the locking elastic arm.

10. The first connector according to claim 9, wherein the locking elastic arm comprises a main body and an inclined portion bent outwardly from the main body; the locking hole is at least partially disposed on the main body and located adjacent to the inclined portion;

the locking protrusion has a guide inclined surface configured to guide the inclined portion when the first connector is mating with the second connector.

11. The first connector according to claim 10, wherein the unlocking slider comprises a pressing portion and an unlocking protrusion extending from the pressing portion, the unlocking protrusion comprises an inclined surface located at an end of the unlocking protrusion, the inclined surface is configured to abut against the inclined portion to disengage the locking elastic arm from the locking protrusion when unlocking.

12. The first connector according to claim 10, wherein the locking elastic arm comprises a widened portion at the free end of the locking elastic arm; and wherein the inclined portion is located on the widened portion.

13. The first connector according to claim 1, wherein the locking structures comprise a locking piece fixed to the first insulating body and having a locking protrusion, and a locking elastic arm provided on the second connector; the locking elastic arm is provided with a locking hole to receive the locking protrusion; and the locking hole is located adjacent to a free end of the locking elastic arm.

14. The first connector according to claim 13, wherein the locking elastic arm comprises a main body and an inclined portion bent outwardly from the main body; the locking hole is at least partly disposed on the main body and located adjacent to the inclined portion;

the locking piece is made of a metal sheet, and the locking protrusion is made by stamping the metal sheet.

15. The first connector according to claim 14, wherein the locking elastic arm comprises a widened portion at the free end of the locking elastic arm; and wherein the inclined portion is located on the widened portion.

16. The first connector according to claim 13, wherein the unlocking slider comprises a pressing portion and an unlocking protrusion extending from the pressing portion;

the first insulating body comprises a mounting groove, a receiving groove and an abutment boss located in the receiving groove;

the locking piece comprises a mounting portion fixed in the mounting groove and an extension arm connected to the mounting portion; the extension arm is received in the receiving groove; the extension arm comprises a supporting portion located adjacent to the mounting portion and supported on the abutment boss, a raised portion extending from the supporting portion away from the mounting portion, and an extension portion extending from the raised portion away from the raised portion; the locking protrusion is stamped and formed on the extension portion;

the unlocking protrusion is configured to press against the raised portion when unlocking; and the extension portion moves in the receiving groove, so that the locking protrusion is separated from the locking elastic arm.

17. The first connector according to claim 1, wherein the first connector further comprises a mating insulating protrusion and a plurality of first conductive terminals at least partially located in the mating insulating protrusion; an extending direction of the mating insulating protrusion and an extending direction of the first insulating body are perpendicular to each other; the mating insulating protrusion comprises a first mating surface and a first mating slot extending through the first mating surface; each first conductive terminal comprises a first mating portion extending into the first mating slot and a first tail portion electrically connected to the built-in circuit board.

18. A connector assembly, comprising: a first connector and a second connector, the first connector being configured to mate with the second connector along a mating direction, the first connector and the second connector being provided with locking structures that lock with each other after mating;

the first connector comprising:

a first insulating body;

a plurality of first conductive elements; and an unlocking slider slidable between an initial position and an unlocking position;

when the unlocking slider reaches the unlocking position, the unlocking slider abuts against at least one of the locking structures, so as to release a locking between the first connector and the second connector;

the second connector comprising:

a second insulating body;

a plurality of second conductive terminals; and a metal shell covering the second insulating body, the metal shell comprising a locking elastic arm, a first wall portion, a second wall portion opposite to the first wall portion, a connecting portion connecting the first wall portion and the second wall portion, a buckling portion connecting the first wall portion and the second wall portion, and a receiving chamber located between the first wall portion and the second wall portion; wherein a height of the first wall portion is greater than a height of the buckling portion; a height of the second wall portion is greater than the height of the buckling portion; a height of the locking elastic arm is greater than the height of the first wall portion; and the height of the locking elastic arm is greater than the height of the second wall portion;

the locking structures comprise the locking elastic arm;

after the first connector is mated with the second connector, the first insulating body is at least partially received in the receiving chamber, the second conductive terminals are in contact with the first conductive elements, and the first connector and the second connector are locked with each other through the locking structures;

when the first connector and the second connector need to be unlocked, the unlocking slider reaches the unlocking position, the unlocking slider abuts against the locking structures to unlock the first connector and the second connector.

19. A first connector, configured to mate with a second connector along a mating direction, the first connector and the second connector being provided with locking structures that lock with each other after mating, the first connector comprising:

a first insulating body;

a plurality of first conductive elements;

an unlocking slider slidable between an initial position and an unlocking position; and an elastic member, the elastic member being configured to exert a restoring force on the unlocking slider to return from the unlocking position to the initial position when the unlocking slider is in the unlocking position;

when the unlocking slider reaches the unlocking position, the unlocking slider abuts against at least one of the locking structures, so as to release a locking between the first connector and the second connector;

wherein the first insulating body comprises a first raised rib, a second raised rib, and a first slide groove located between the first raised rib and the second raised rib; when the unlocking slider slides along a first direction parallel to the mating direction, the unlocking protrusion slides in the first slide groove along the first direction;

wherein the unlocking slider comprises a pressing portion, an unlocking protrusion extending from the pressing portion, and a locking arm extending from the pressing portion; the locking arm comprises a first locking arm and a second locking arm; the unlocking protrusion extends beyond the first locking arm and the second locking arm along the first direction;

the first locking arm comprises a first hook portion located at a free end of the first locking arm; the second locking arm comprises a second hook portion located at a free end of the second locking arm; both the first hook portion and the second hook portion protrude toward a side where the unlocking protrusion is located;

the first raised rib comprises a first protrusion, the second raised rib comprises a second protrusion, the locking portion comprises a first locking surface located on the first protrusion and a second locking surface located on the second protrusion; and the first hook portion mates with the first locking surface; and the second hook portion mates with the second locking surface.

20. The first connector according to claim 19, wherein the first connector comprises a built-in circuit board fixed to the first insulating body, the built-in circuit board comprises a tongue plate protruding beyond the first insulating body, and the plurality of first conductive elements are a plurality of mating metal pads formed on at least one surface of the tongue plate.

* * * * *